UNITED STATES PATENT OFFICE.

THOMAS H. JENKINS, OF NEW YORK, N. Y.

IMPROVED PROCESS FOR MAKING STEEL.

Specification forming part of Letters Patent No. 53,625, dated April 3, 1866.

*To all whom it may concern:*

Be it known that I, THOMAS H. JENKINS, of the city, county, and State of New York, have invented a new and useful Process for Making Steel; and I do hereby declare that the following is a full, clear, and exact description thereof.

The object of my invention is to produce steel of good quality at less cost than by any process heretofore known and practiced.

I take cast-iron which has been carried through the usual process to make what is commonly known as "malleable" cast-iron, and heat it to a cherry-red heat, and at that heat immerse it in a solution composed of the following ingredients and in about the following proportions, viz: twenty-eight gallons of water, ninety-six ounces of sulphuric acid, forty-four ounces of sal-ammoniac, twenty ounces of Glauber salts, and thirty ounces of common salt. After the malleable cast-iron has been in the solution sufficiently long to become cool, I take it out and cut it into pieces of about the size to which blistered steel is reduced for the well-known process of making cast-steel, and when thus reduced I put it into crucibles with an equal weight of good wrought-iron, preferring Swedish charcoal-iron, in like manner reduced to small pieces, and add to the charge black oxide of manganese and common salt, in the proportion of eight ounces of the manganese and a handful of salt to fifty pounds of the mixed iron. The crucible thus charged is to be heated in the usual manner practiced for making cast-steel until the charge is thoroughly melted, which will take from three to four hours, and then it is run into suitable molds and the ingots permitted to cool, and when cool the ingots are to be heated and hammered as heretofore practiced in the manufacture of steel.

By increasing or decreasing the proportion of wrought-iron the grade of the steel can be varied at pleasure, the grade of the steel being elevated by the reduction of the proportion of wrought-iron.

The steel produced by this process will be found to be of a very superior quality, and to be less brittle than steel produced by any process before known and practiced.

The quantity of the solution to be prepared will depend upon the quantity of malleable cast-iron to be treated, as the bath should be sufficient to admit it. I prefer in the preparation of the solution to use all the ingredients named, having found that by the use of it I am enabled to produce the best results; but good results can be produced by the use of solutions modified as follows, viz: twenty-eight gallons of water, twenty-eight pounds of sulphuric acid, and twenty-eight ounces of nitric acid; or twenty-eight gallons of water, ninety-six ounces sulphuric acid, and forty-four ounces of sal-ammoniac; or twenty-eight gallons of water, ninety-six ounces of sulphuric acid, and twenty ounces of Glauber salts; or twenty-eight gallons of water, ninety-six ounces of sulphuric acid, and thirty ounces of common salt. And as to all these various modifications of the solution the proportions of the ingredients may be varied, although the proportions given are deemed to be the best.

What I claim as my invention, and desire to secure by Letters Patent, is—

The process of making steel by using what is known as "malleable cast-iron" which has been subjected while in the heated state to the action of a solution substantially such as described, and melting it in admixture with wrought-iron, in a crucible or equivalent therefor, substantially as described.

THO. H. JENKINS.

Witnesses:
ANDREW DE LACY,
WM. H. BISHOP.